April 7, 1925.
H. ULLOM
1,532,279
ENDLESS SICKLE BLADE
Filed Aug. 5, 1920
2 Sheets-Sheet 2
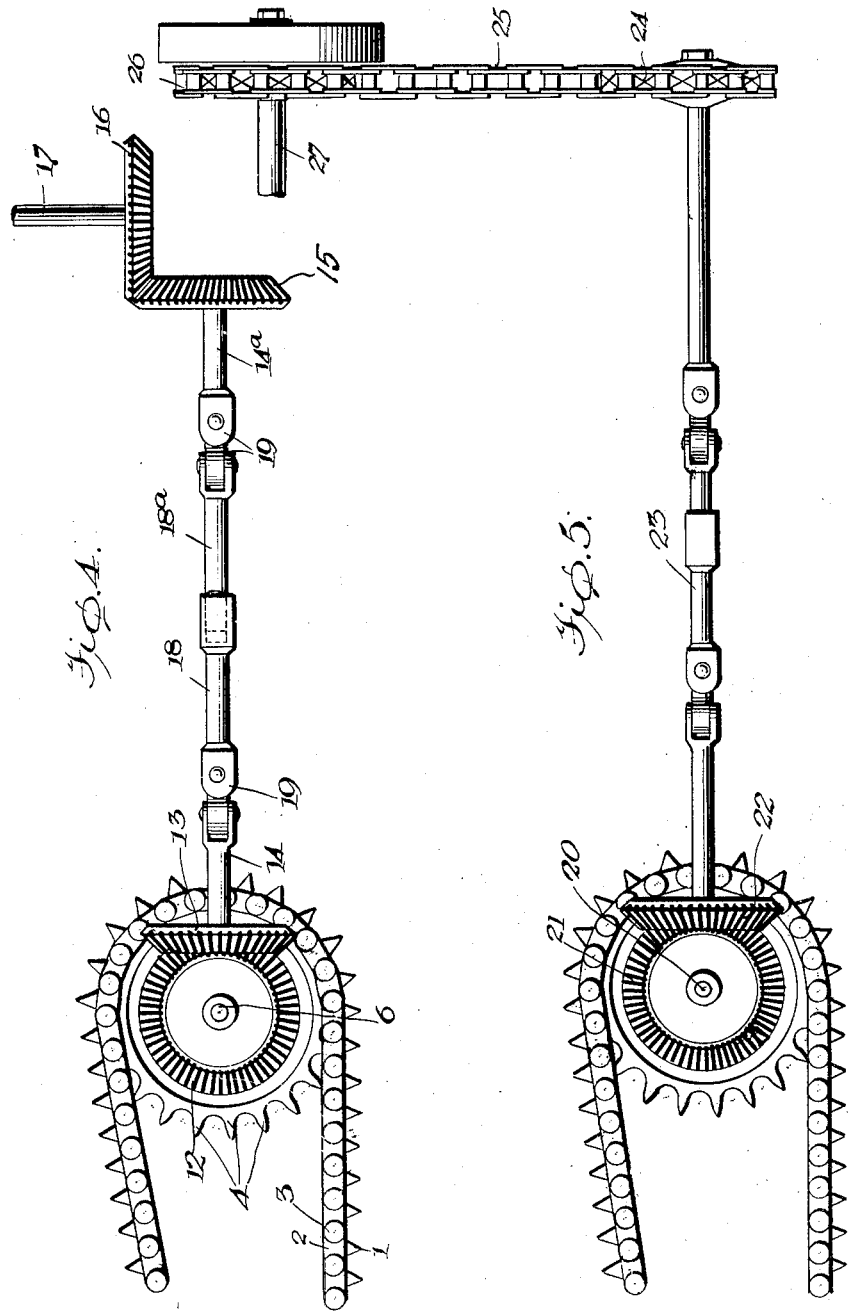
INVENTOR
Homer Ullom.
BY
ATTORNEYS April 7, 1925. 1,532,279
H. ULLOM
ENDLESS SICKLE BLADE
Filed Aug. 5. 1920 2 Sheets-Sheet 1
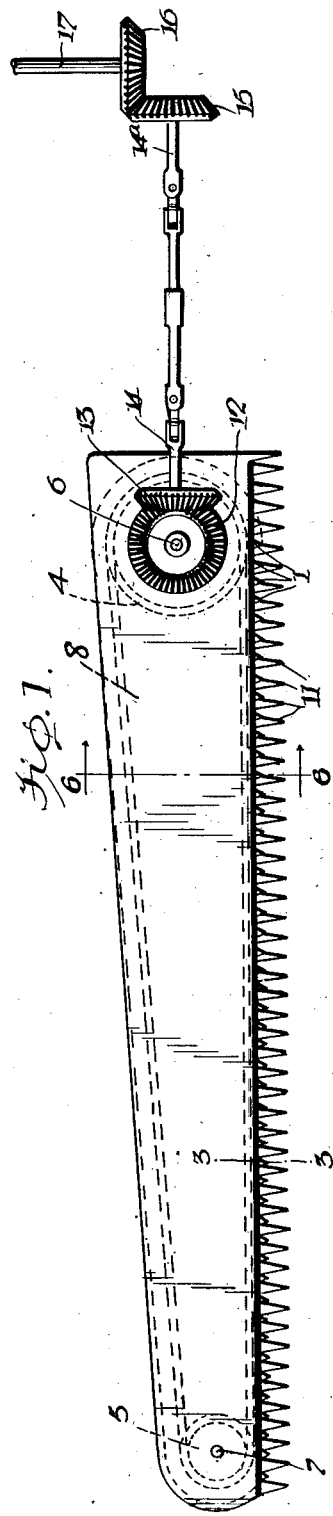
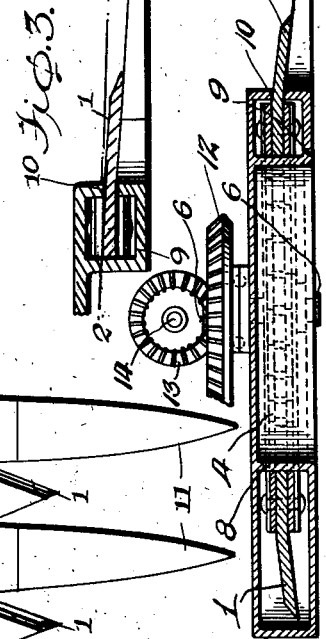
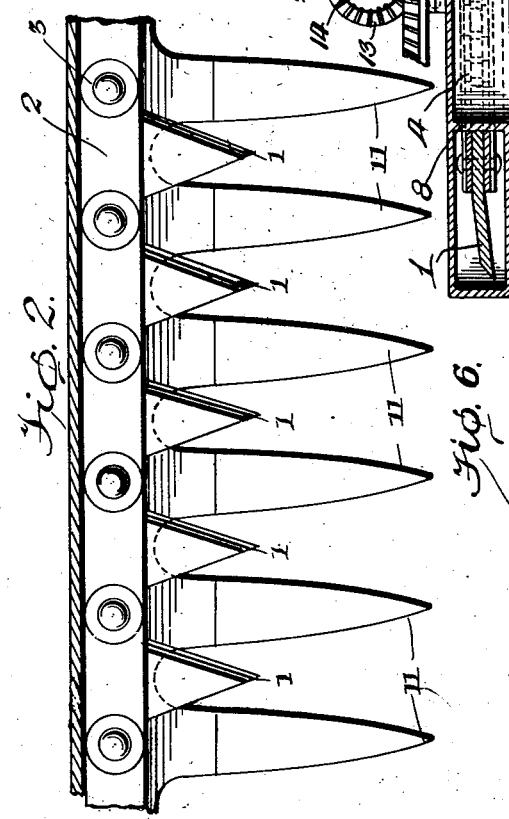
INVENTOR
Homer Ullom.
BY
ATTORNEYS

Patented Apr. 7, 1925.

1,532,279

UNITED STATES PATENT OFFICE.

HOMER ULLOM, OF LAMAR, COLORADO.

ENDLESS SICKLE BLADE.

Application filed August 5, 1920. Serial No. 401,365.

*To all whom it may concern:*

Be it known that I, HOMER ULLOM, a citizen of the United States, and a resident of Lamar, in the county of Prowers and State of Colorado, have invented certain new and useful Improvements in Endless Sickle Blades, of which the following is a specification.

My invention is an improvement in endless sickle blades, and has for its object to provide a blade of the character specified, composed of a series of linked blades connected in an endless belt, and supported for movement in one direction.

A further object is to provide a housing for the blade, so arranged that the housing forms a guide and a protection for the blade.

A further object is to provide a connection between the blade and its operating mechanism, such that the blade as a whole may be moved into and out of operative position without interfering with the said connection.

In the drawings, Figure 1 is a plan view of the improved blade,

Figure 2 is a section on the line 2—2 of Figure 3,

Figure 3 is a section on the line 3—3 of Figure 1,

Figure 4 is an enlarged detail of the connection between the driving mechanism and the sickle blades, Figure 5 is a detail showing a modified form of connection.

Figure 6 is a transverse vertical section taken along the line 6—6 of Figure 1.

In the present embodiment of the invention, the blade comprises a series of substantially triangular knives or blades 1, each of which has one edge rigidly secured between a pair of links 2, and the other two edges of the blade are beveled, as shown in Figure 2, to form cutting edges. The links 2 are pivotally connected by means of rivets 3, or the like, to form an endless chain, and the chain so formed is supported by sprocket wheels 4 and 5, which are secured to shafts 6 and 7, supported by a housing 8. This housing, as shown in Figure 1, is of greater width at the inner end of the sickle than at the outer end, and it is composed of a plate having a continuous chamber or guideway 9 formed therein, said chamber or guideway being designed to form the path for the endless chain in its movement. That is, the chain, throughout its movement, moves in the chamber. This chamber, as indicated in dotted lines in Figure 1, is of greatest depth at the rear of the housing and of least depth at the front. At the rear and at the ends, the chamber 9 is of a depth to receive the links 2 and the blades 1, while at the front it is of a depth corresponding only to the width of the links. At the front, the chamber is slotted longitudinally, as shown at 10, to permit the extension of the blades beyond the chamber, as clearly shown in Figure 3. The front chamber wall at the front of the housing has guard fingers 11 extending outwardly therefrom, and co-operating with the blades 1 as ledger blades.

The upper faces of the fingers forming the guard fence or ledger blades are inclined downwardly towards the outer free ends of said fingers.

The shaft 6, in addition to sprocket wheel 4, carries a beveled gear wheel 12, which meshes with a gear wheel 13 on one of the sections 14 of a transmission shaft, suitably supported adjacent to the housing. This transmission shaft consists of similar end sections 14—14$^a$, the section 14 carrying the beveled gear 13, while the section 14$^a$ carries a beveled gear 15 meshing with a similar gear 16 on a driving shaft 17. The sections 14 and 14$^a$ are connected by a telescoping section, consisting of portions 18 and 18$^a$. These portions carry, the portion 18, a socket, which has a polygonal bore, and the portion 18$^a$, a polygonal portion fitting and sliding therein, and these portions 18 and 18$^a$ are connected to the sections 14 and 14$^a$ respectively, by universal joints, indicated at 19. This arrangement permits the shafts 6 and 17 to move toward or from each other, and permits them to take positions at various angles with respect to each other without interfering with the driving connection.

In Figure 5, the shaft 20, which corresponds to the shaft 6 of Figure 4, carries a beveled gear 21, meshing with the gear 22 on a transmission shaft 23, corresponding generally to the shaft 14—14$^a$, and 18—18$^a$. This transmission shaft carries a sprocket wheel 24 at the end remote from the shaft 20, and the sprocket wheel is connected by a chain 25 with a similar wheel 26 on the driving shaft 27. It will be obvious that other connections might be used. The portions of the housing adjacent the gears 5 and 12 are adapted to be provided with covered openings to permit the insertions of said gears and the chains carrying the blades.

In operation, the driving shaft being driven, the sickle will also be driven. The blades cooperating with the guard teeth 11 will sever the grain, as the sickle moves through the field. When travelling on the road, the sickle-supporting housing may be swung upward in the usual manner.

I claim:—

A guard bar comprising a housing providing a continuous chamber rectangular in cross section and having a slot extending along the front edge of said housing, in combination with an endless cutter having blades, the guard bar being provided with guard fingers formed integrally with the chamber and extending outwardly, the fingers being provided with upper faces inclined downwardly towards the outer free ends of the fingers, with the blades of the endless belt inclined and slidable in face to face engagement with said fingers.

HOMER ULLOM.